(12) United States Patent
Perez et al.

(10) Patent No.: US 9,861,886 B2
(45) Date of Patent: *Jan. 9, 2018

(54) SYSTEMS AND METHODS FOR APPLYING ANIMATIONS OR MOTIONS TO A CHARACTER

(71) Applicant: Microsoft Technology Licensing, LLC, Redmond, WA (US)

(72) Inventors: Kathryn Stone Perez, Shoreline, WA (US); Alex A. Kipman, Duvall, WA (US); Jeffrey Margolis, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/331,063

(22) Filed: Jul. 14, 2014

(65) Prior Publication Data
US 2014/0320508 A1    Oct. 30, 2014

Related U.S. Application Data

(63) Continuation of application No. 12/475,422, filed on May 29, 2009, now Pat. No. 8,803,889.

(51) Int. Cl.
*G06T 13/00* (2011.01)
*G06T 15/00* (2011.01)
(Continued)

(52) U.S. Cl.
CPC .......... *A63F 13/213* (2014.09); *A63F 13/428* (2014.09); *A63F 13/57* (2014.09);
(Continued)

(58) Field of Classification Search
None
See application file for complete search history.

(56) References Cited

U.S. PATENT DOCUMENTS

| 5,616,078 A | 4/1997 | Oh |
| 5,966,129 A | 10/1999 | Matsukuma et al. |

(Continued)

FOREIGN PATENT DOCUMENTS

| JP | 07-185131 A | 7/1995 |
| JP | H09-115004 | 5/1997 |

(Continued)

OTHER PUBLICATIONS

Molet et al., "An Animation Interface Designed for Motion Capture", Computer Animation Conference'97, Geneva, Switzerland, Jun. 4, 1997, 77-85.

(Continued)

*Primary Examiner* — Tize Ma
(74) *Attorney, Agent, or Firm* — Baker & Hostetler LLP

(57) ABSTRACT

An virtual character such as an on-screen object, an avatar, an on-screen character, or the like may be animated using a live motion of a user and a pre-recorded motion. For example, a live motion of a user may be captured and a pre-recorded motion such as a pre-recorded artist generated motion, a pre-recorded motion of the user, and/or a programmatically controlled transformation may be received. The live motion may then be applied to a first portion of an the virtual character and the pre-recorded motion may be applied to a second portion of the virtual character such that the virtual character may be animated with a combination of the live and pre-recorded motions.

19 Claims, 14 Drawing Sheets

(51) Int. Cl.
| | |
|---|---|
| G06T 13/20 | (2011.01) |
| G06T 13/40 | (2011.01) |
| A63F 13/213 | (2014.01) |
| G06F 3/01 | (2006.01) |
| A63F 13/428 | (2014.01) |
| A63F 13/57 | (2014.01) |
| G06K 9/00 | (2006.01) |
| G06T 7/20 | (2017.01) |
| G06T 13/80 | (2011.01) |
| G06T 7/246 | (2017.01) |

(52) U.S. Cl.
CPC ......... *G06F 3/017* (2013.01); *G06K 9/00342* (2013.01); *G06T 7/20* (2013.01); *G06T 7/251* (2017.01); *G06T 13/40* (2013.01); *G06T 13/80* (2013.01); *A63F 2300/1087* (2013.01); *A63F 2300/6607* (2013.01); *A63F 2300/69* (2013.01); *A63F 2300/8005* (2013.01); *A63F 2300/8011* (2013.01); *G06T 2207/10016* (2013.01); *G06T 2207/10028* (2013.01); *G06T 2207/30196* (2013.01)

(56) References Cited

U.S. PATENT DOCUMENTS

| | | |
|---|---|---|
| 6,057,909 A | 5/2000 | Yahav et al. |
| 6,088,042 A | 7/2000 | Handelman et al. |
| 6,100,517 A | 8/2000 | Yahav et al. |
| 6,115,052 A | 9/2000 | Freeman et al. |
| 6,256,033 B1 | 7/2001 | Nguyen |
| 6,498,628 B2 | 12/2002 | Iwamura |
| 6,502,515 B2 | 1/2003 | Burckhardt et al. |
| 6,512,838 B1 | 1/2003 | Rafii et al. |
| 6,539,931 B2 | 4/2003 | Trajkovic et al. |
| 6,552,729 B1 | 4/2003 | Di Bernardo et al. |
| 6,554,706 B2 | 4/2003 | Kim et al. |
| 6,674,877 B1 | 1/2004 | Jojic et al. |
| 6,738,065 B1 | 5/2004 | Even-Zohar |
| 6,771,277 B2 | 8/2004 | Ohba |
| 6,950,534 B2 | 9/2005 | Cohen et al. |
| 7,006,236 B2 | 2/2006 | Tomasi et al. |
| 7,050,177 B2 | 5/2006 | Tomasi et al. |
| 7,151,530 B2 | 12/2006 | Roeber et al. |
| 7,224,384 B1 | 5/2007 | Iddan et al. |
| 7,227,526 B2 | 6/2007 | Hildreth et al. |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,367,887 B2 | 5/2008 | Watabe et al. |
| 7,403,202 B1 | 7/2008 | Nash |
| 7,590,262 B2 | 9/2009 | Fujimura et al. |
| 8,111,284 B1 | 2/2012 | Givon |
| 8,803,889 B2 * | 8/2014 | Perez ................ G06K 9/00342 345/419 |
| 2001/0056477 A1 | 12/2001 | McTernan et al. |
| 2002/0024517 A1 | 2/2002 | Yamaguchi et al. |
| 2004/0155962 A1 | 8/2004 | Marks |
| 2004/0207597 A1 | 10/2004 | Marks |
| 2005/0059488 A1 | 3/2005 | Larsen et al. |
| 2005/0255434 A1 | 11/2005 | Lok et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0012866 A1 | 1/2008 | Forbes |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0170777 A1 | 7/2008 | Sullivan et al. |
| 2008/0215972 A1 | 9/2008 | Zalewski et al. |
| 2008/0215973 A1 | 9/2008 | Zalewski et al. |
| 2009/0085864 A1 | 4/2009 | Kutliroff et al. |
| 2009/0104993 A1 | 4/2009 | Ye |
| 2009/0141933 A1 | 6/2009 | Wagg |
| 2009/0167679 A1 | 7/2009 | Klier et al. |
| 2009/0221368 A1 | 9/2009 | Yen et al. |
| 2012/0320052 A1 | 12/2012 | Givon |

FOREIGN PATENT DOCUMENTS

| | | |
|---|---|---|
| JP | H09-198522 | 7/1997 |
| JP | 2000-163178 A | 6/2000 |
| JP | 2002-058045 A | 2/2002 |
| JP | 2006-514366 A | 4/2006 |
| JP | 2008-508590 | 3/2008 |
| RU | 2344483 C2 | 1/2009 |
| WO | WO 99/15863 A1 | 4/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2008/144843 A1 | 12/2008 |
| WO | WO 2009/059065 A1 | 5/2009 |

OTHER PUBLICATIONS

Starck et al., "Surface Capture for Performance-Based Animation", Centre for Vision, Speech and Signal Processing, Mar. 13, 2007, 1-23.

PCT Application No. PCT/US2010/035885: International Search Report and Written Opinion of the International Searching Authority, Dec. 22, 2010, 8 pages.

Qian et al., "A Gesture-Driven Multimodal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Hasegawa; "Character Motion Synthesis for Video Games" Journal of Japanese Society for Artificial Intelligence; vol. 23 Issue 1; Jan. 2008; 6 pages; contains abstract.

"Office Action Issued in Canadian Patent Application No. 2,760,210", dated Dec. 15, 2016, 5 Pages.

Kim et al.; "Trends of Digital Creature Production Technology"; Electronics and Telecommunications Trends; vol. 22 No. 4; Aug. 2007; p. 74-86.

Korean Patent Application No. 10-2011-7028425; Office Action; dated Feb. 24, 2016; 7 pages; (English Translation).

Korean Paten Application No. 10-2011-7028425; Notice of Allowance; dated Mar. 20, 2017; 3 pages.

European Patent Application No. 10781049.1; Supp Search Report; dated May 29, 2017; 4 pages.

European Patent Application No. 10781049.1; Office Action; dated Jun. 13, 2017; 5 pages.

\* cited by examiner

300

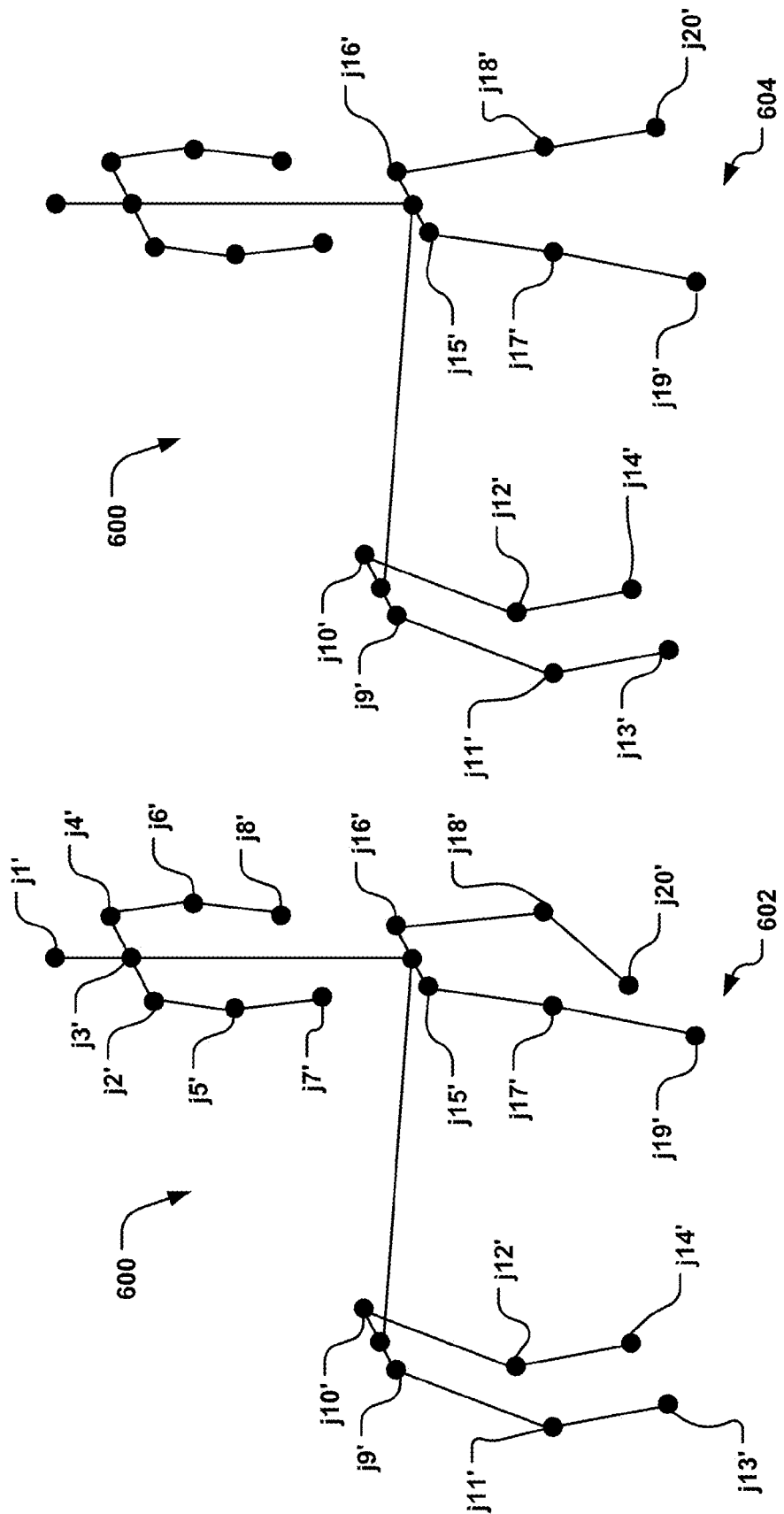

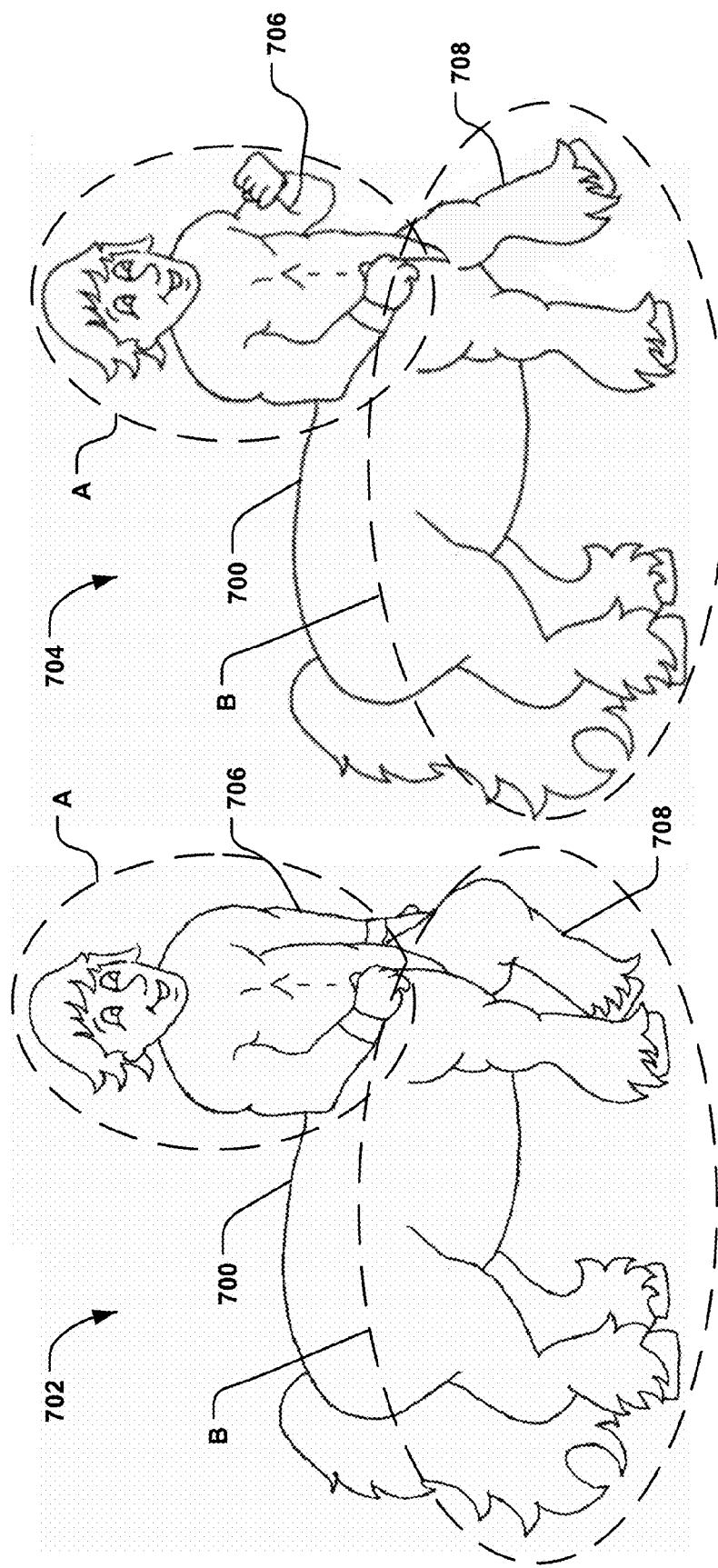

SYSTEMS AND METHODS FOR APPLYING ANIMATIONS OR MOTIONS TO A CHARACTER

CROSS-REFERENCE TO RELATED APPLICATIONS

This application is a continuation of prior application Ser. No. 12/475,422, filed May 29, 2009, the contents of which are herein incorporated by reference in their entirety.

BACKGROUND

Many computing applications such as computer games, multimedia applications, or the like include avatars or characters that are animated using typical motion capture techniques. For example, when developing a golf game, a professional golfer may be brought into a studio having motion capture equipment including, for example, a plurality of cameras directed toward a particular point in the studio. The professional golfer may then be outfitted in a motion capture suit having a plurality of point indicators that may be configured with and tracked by the cameras such that the cameras may capture, for example, golfing motions of the professional golfer. The motions can then be applied to an avatar or character during development of the golf game. Upon completion of the golf game, the avatar or character can then be animated with the motions of the professional golfer during execution of the golf game. Unfortunately, typical motion capture techniques are costly, tied to the development of a specific application, and do not include motions associated with an actual a player or user of the application.

SUMMARY

Disclosed herein are systems and methods for blending animations. For example, in one embodiment, a live motion of a user may be captured and a pre-recorded motion such as a pre-recorded artist generated motion, a pre-recorded motion of the user, and/or a programmatically controlled transformation may be received. The live motion may then be applied to a first portion of a virtual character and the pre-recorded motion may be applied to a second portion of the virtual character such that the virtual character may be animated with a combination of the live and pre-recorded motions. According to one embodiment, the live motion and/or the pre-recorded motion may be applied to the virtual character in response to receiving a gesture from the user that may be associated with an animation command. Additionally, the virtual character may have be animated with a combination of pre-recorded motions such as a pre-recorded motion of the user and a pre-recorded artist generated animation by, for example, applying the pre-recorded motion of the user to the first portion of the virtual character and applying the pre-recorded artist generated animation to the second portion of the virtual character.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 9A-9B illustrate an example embodiment of a model for a virtual character that may be animated based on the model at various points in time.

FIGS. 10A-10B illustrate an example embodiment of a virtual character that may be animated.

DETAILED DESCRIPTION OF ILLUSTRATIVE EMBODIMENTS

As will be described herein, a user may control an application executing on a computing environment such as a game console, a computer, or the like and/or may animate a virtual character such as an avatar, an on-screen character, an on-screen object, or the like by performing one or more gestures and/or movements. According to one embodiment, the gestures and/or movements may be received by, for example, a capture device. For example, the capture device may capture a depth image of a scene. In one embodiment, the capture device may determine whether one or more targets or objects in the scene corresponds to a human target such as the user. Each target or object that matches the corresponds to a human target may then be scanned to generate a model such as a skeletal model, a mesh human model, or the like associated therewith. In an example embodiment, the model may be tracked, a motion capture file of the tracked model may be generated, a virtual character or object associated with the model of the user may be rendered, a virtual character or object may be animated with live motions associated with the model of the user and/or pre-recorded motions, and/or which controls to perform in an application executing on the computer environment based on, for example, the tracked model may be determined.

Figure 1A:
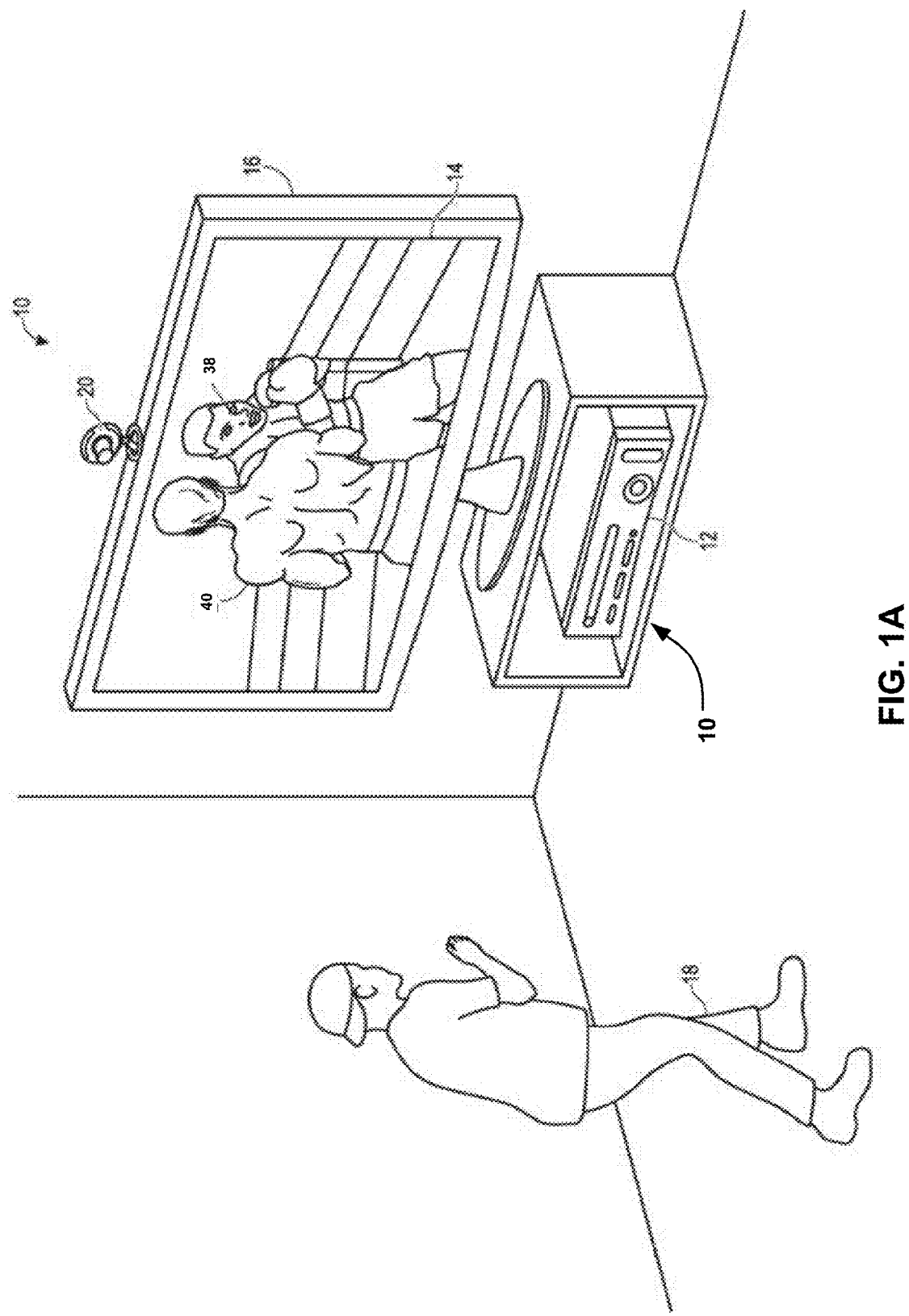
FIGS. 1A and 1B illustrate an example embodiment of a target recognition, analysis, and tracking system with a user playing a game.
Figure 1B:
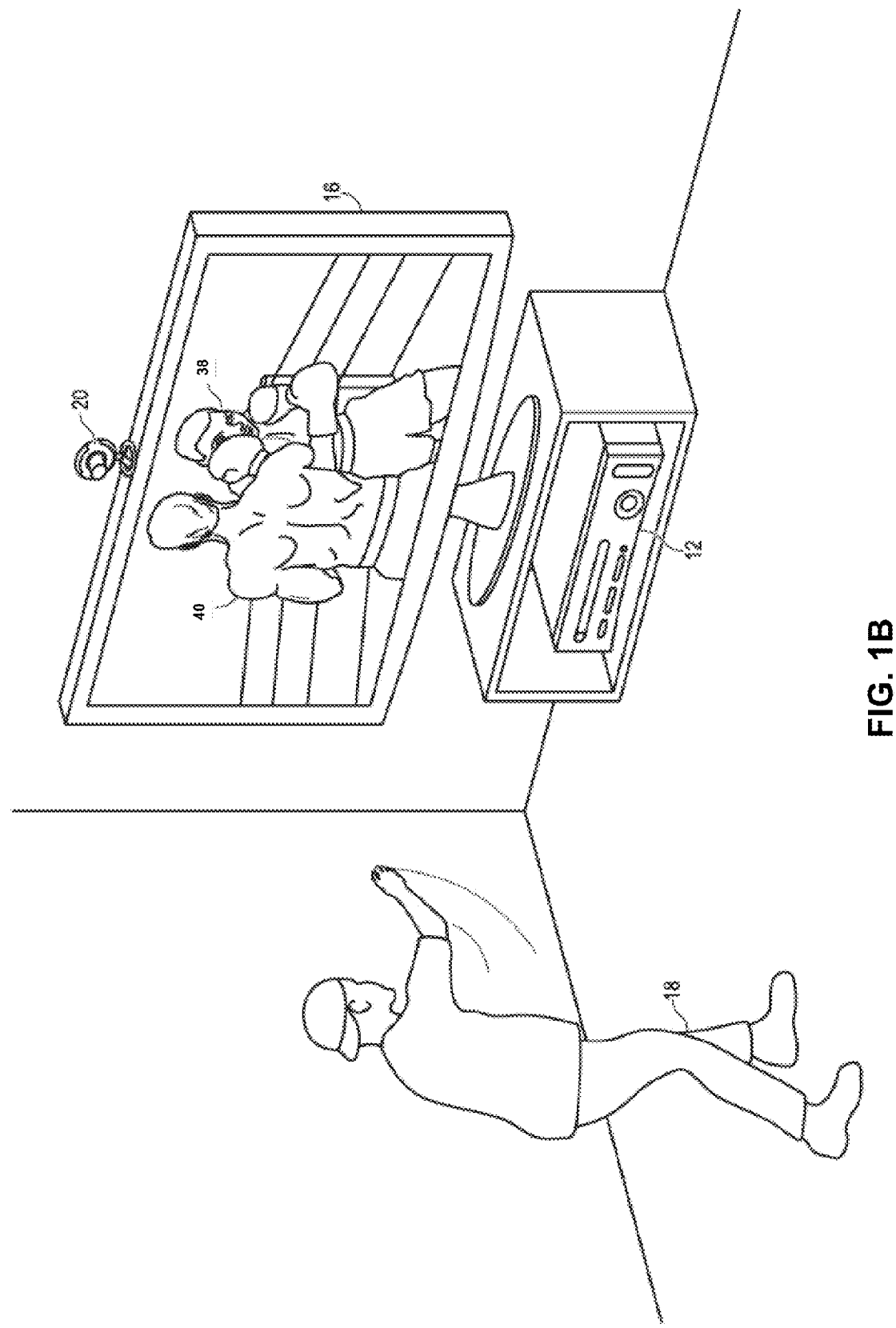

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for capturing a live motion of a user, receiving a pre-recorded motion, applying the live motion to a first portion of a virtual object and the pre-recorded motion to a second portion of the virtual object, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within an application and/or animate a virtual character such as an avatar, an on-screen character, an on-screen object, or the like, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the gestures and/or movements of user 18 may be captured to animate a virtual character such as an avatar, an on-screen character, an on-screen object, or the like and/or may be interpreted as controls that may be used to affect the application being executed by computer environment 12. Thus, according to one embodiment, the user 18 may move his or her body to control the application and/or animate the virtual object.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
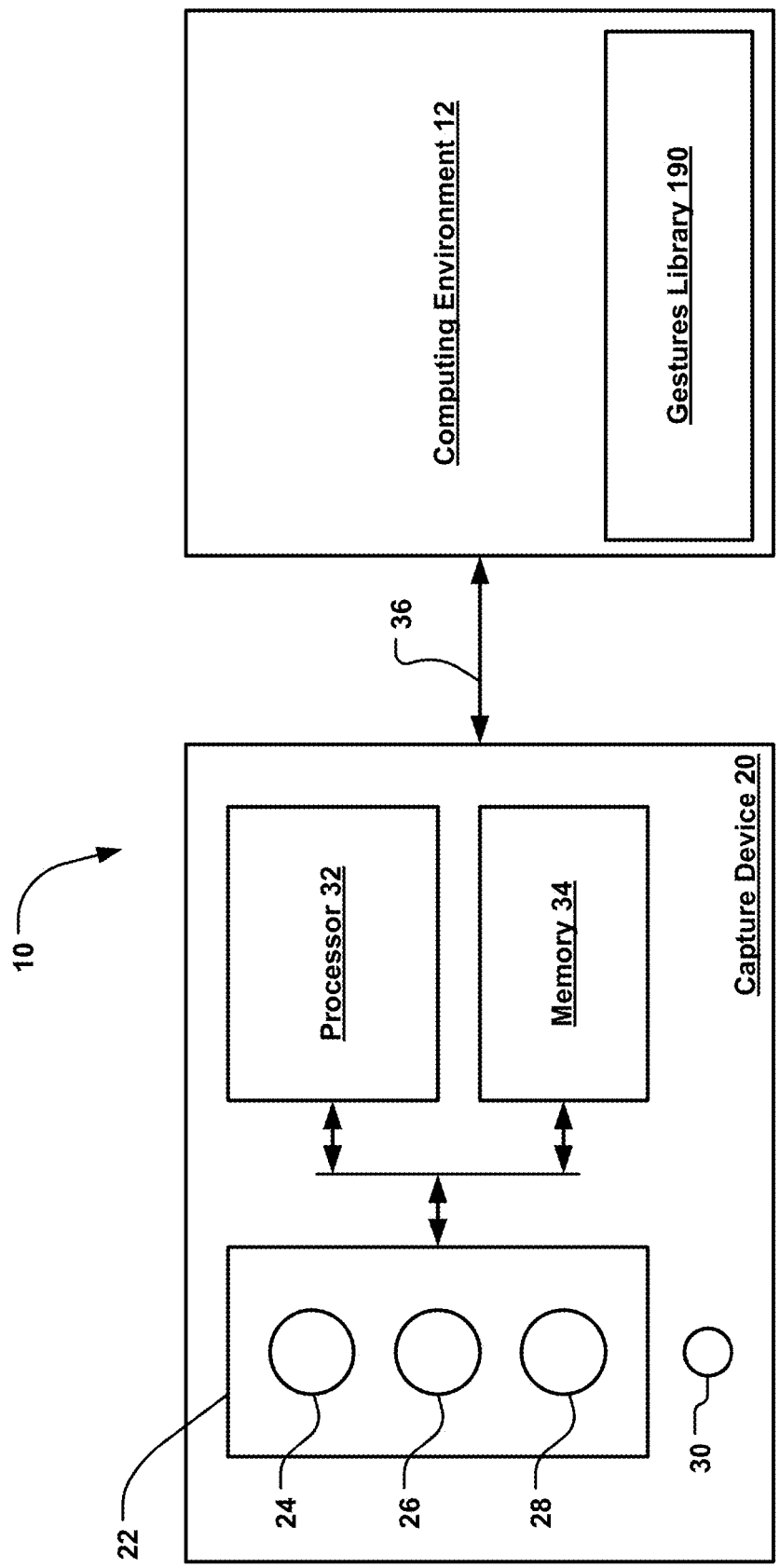
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for capturing a live motion of a user, receiving a pre-recorded motion, applying the live motion to a first portion of a virtual object and the pre-recorded motion to a second portion of the virtual object, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and/or a skeletal model that may be generated by the capture device 20 to the computing environment 12 via the communication link 36. The computing environment 12 may then use the model, depth information, and captured images to, for example, control an application such as a game or word processor and/or animate a virtual character such as an or on-screen character, an avatar, an on-screen object, or the like. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
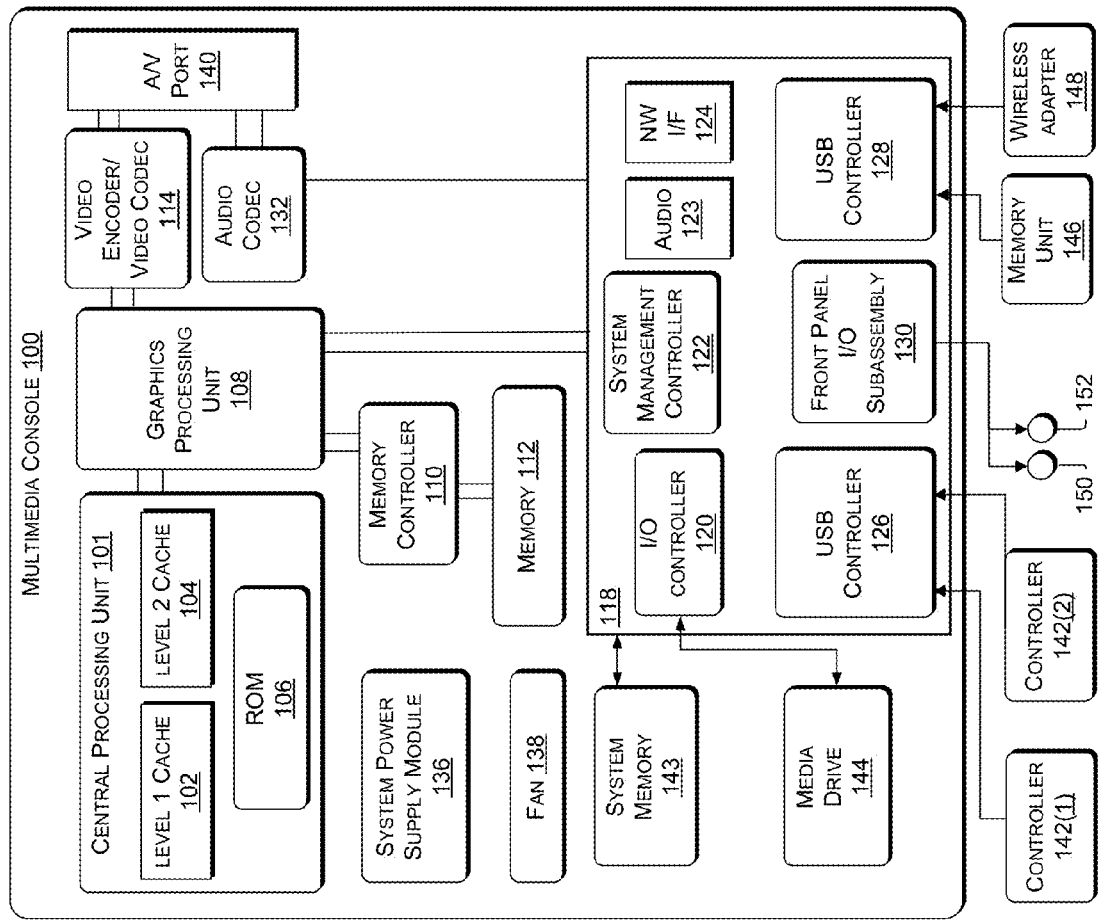
FIG. 3 illustrates an example embodiment of a computing environment that may be used to interpret one or more gestures in a target recognition, analysis, and tracking system and/or animate a virtual character displayed by a target recognition, analysis, and tracking system.

FIG. 3 illustrates an example embodiment of a computing environment that may be used to interpret one or more gestures in a target recognition, analysis, and tracking system and/or animate a virtual character such as an avatar, an on-screen character, an on-screen object, or the like displayed by the target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
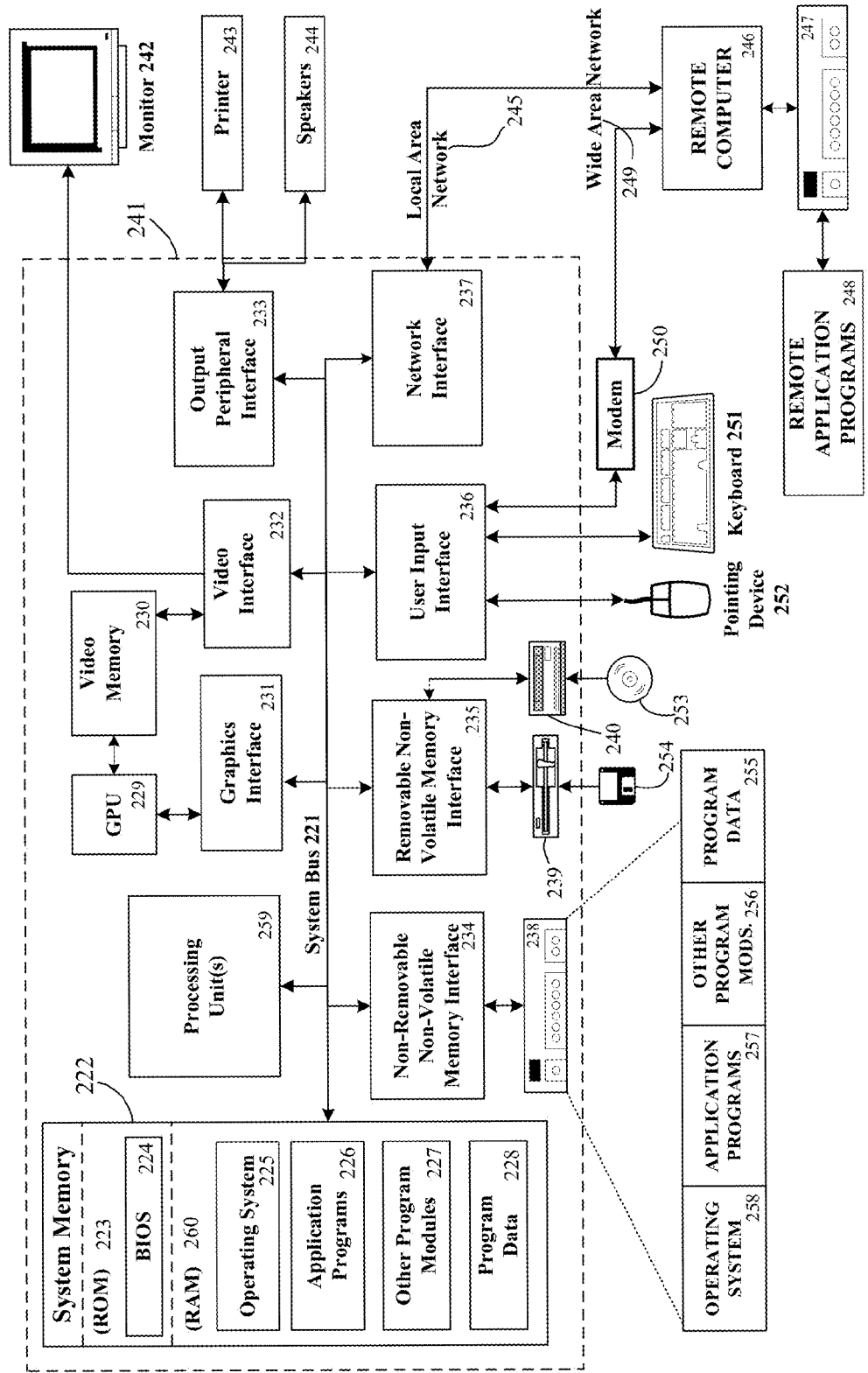
FIG. 4 illustrates another example embodiment of a computing environment that may be used to interpret one or more gestures in a target recognition, analysis, and tracking system and/or animate a virtual character displayed by a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system and/or animate a virtual character such as an avatar, an on-screen character, an on-screen object, or the like displayed by a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
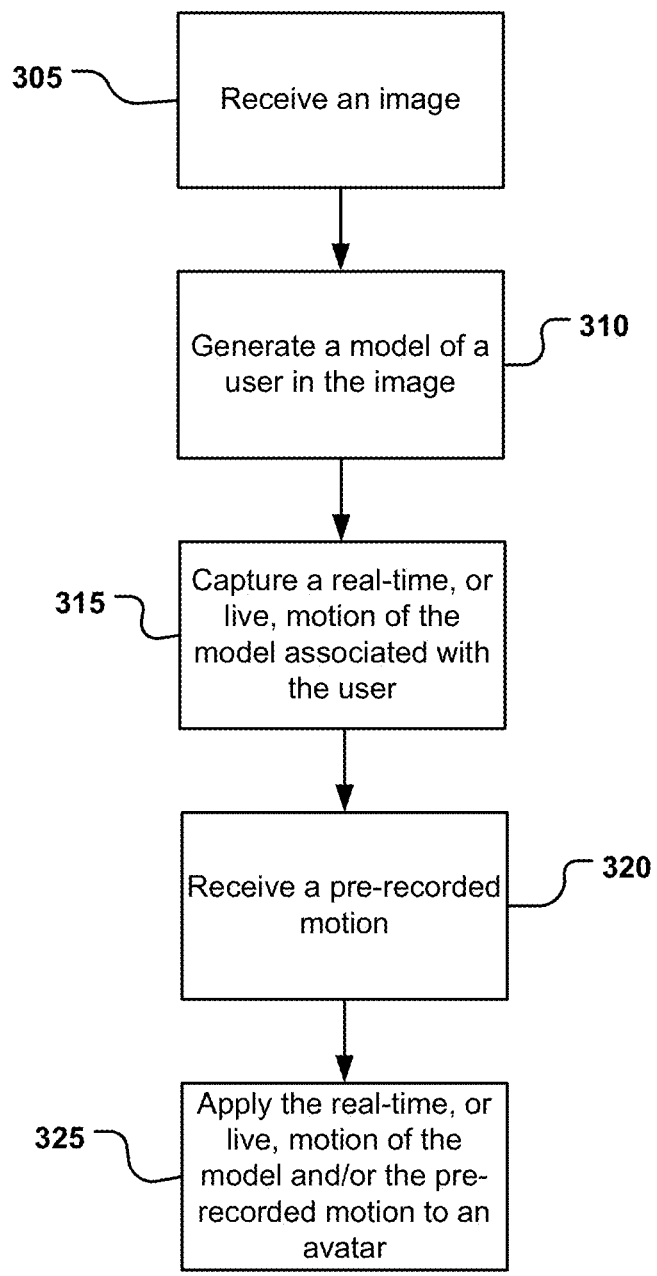
FIG. 5 depicts a flow diagram of an example method for generating and applying a motion capture file of a user.

FIG. 5 depicts a flow diagram of an example method 300 for blending animations. The example method 300 may be implemented using, for example, the capture device 20 and/or the computing environment 12 of the target recognition, analysis, and tracking system 10 described with respect to FIGS. 1A-4. In an example embodiment, the example method 300 may take the form of program code (i.e., instructions) that may be executed by, for example, the capture device 20 and/or the computing environment 12 of the target recognition, analysis, and tracking system 10 described with respect to FIGS. 1A-4.

According to one embodiment, at 305, an image may be received. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain an image such as an RGB image, a depth image, or the like of the scene using any suitable technique such as time-of-flight analysis, structured light analysis, stereo vision analysis, or the like.

For example, in one embodiment, the image may include a depth image. The depth image may be a plurality of observed pixels where each observed pixel has an observed depth value. For example, the depth image may include a two-dimensional (2-D) pixel area of the captured scene where each pixel in the 2-D pixel area may represent a depth value such as a length or distance in, for example, centimeters, millimeters, or the like of an object in the captured scene from the capture device.

Figure 6:
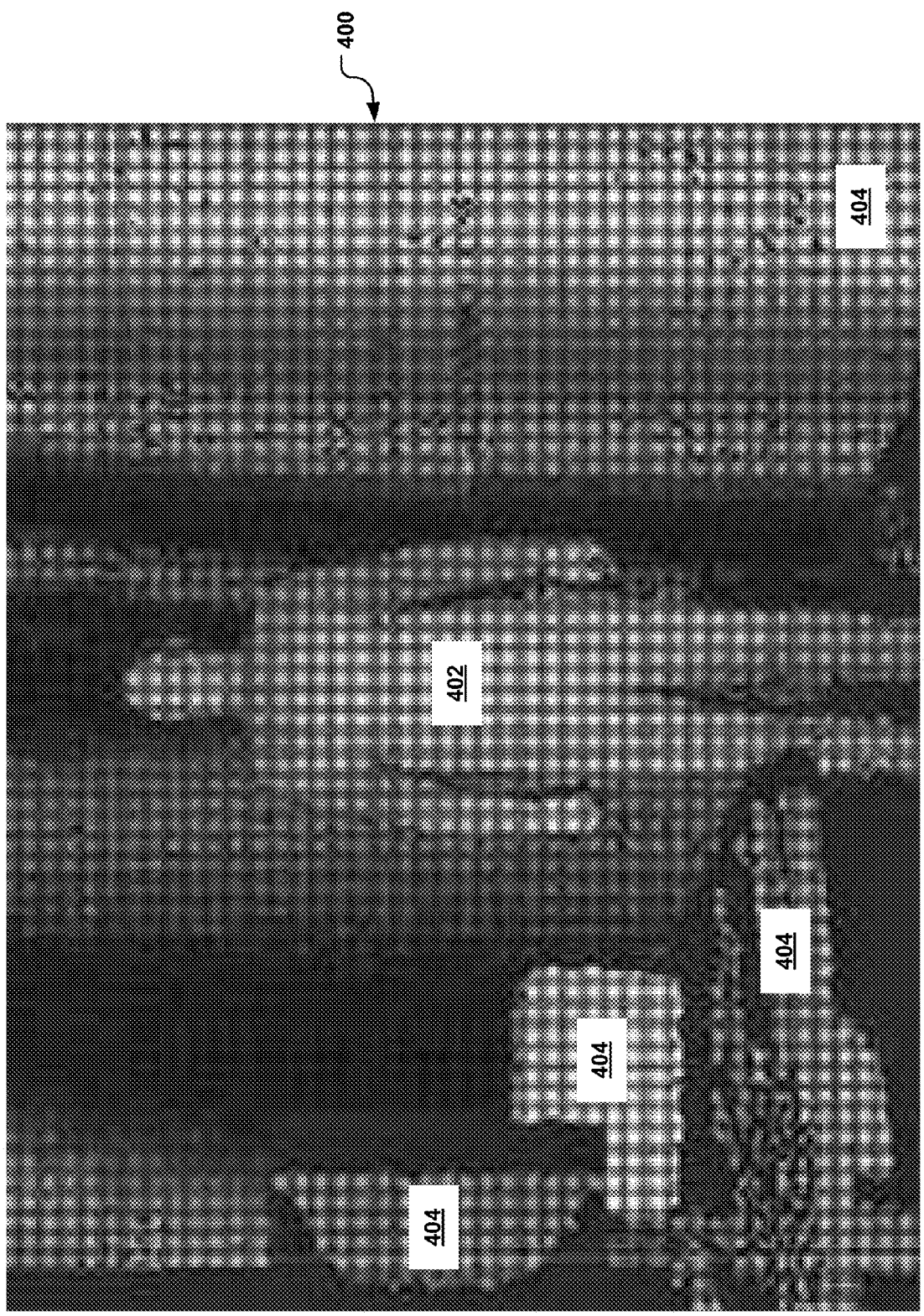
FIG. 6 illustrates an example embodiment of an image that may include a human target associated with a user.

FIG. 6 illustrates an example embodiment of a depth image 400 that may be received at 305. According to an example embodiment, the depth image 400 may be an image or frame of a scene captured by, for example, the 3-D camera 26 and/or the RGB camera 28 of the capture device 20 described above with respect to FIG. 2. As shown in FIG. 6, the depth image 400 may include a human target 402 corresponding to, for example, a user such as the user 18 described above with respect to FIGS. 1A and 1B and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel in the 2-D pixel area may represent a depth value such as a length or distance in, for example, centimeters, millimeters, or the like of a target or object in the captured scene from the capture device. In one embodiment, the depth image 400 may be colorized such that different colors of the pixels of the depth image correspond to and/or visually depict different distances of the human target 402 and non-human targets 404 from the capture device. For example, according to one embodiment, the pixels associated with a target closest to the capture device may be colored with shades of red and/or orange in the depth image whereas the pixels associated with a target further away may be colored with shades of green and/or blue in the depth image.

Referring back to FIG. 5, in one embodiment, upon receiving the image, at 305, the image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, which will be described in more detail below.

At 310, a model of a user in the image may be generated. For example, upon receiving the image, the target recognition, analysis, and tracking system may determine whether the depth image includes a human target such as the human target 402 described above with respect to FIG. 6 corresponding to, for example, a user such as the user 18, described above with respect to FIGS. 1A and 1B, by flood filling each target or object in the depth image and comparing each flood filled target or object to a pattern associated with a body model of a human in various positions or poses. The flood filled target or object that matches the pattern may then be isolated and scanned to determine values including, for example, measurements of various body parts. According to an example embodiment, a model such as a skeletal model, a mesh model, or the like may then be generated based on the scan. For example, according to one embodiment, measurement values that may be determined by the scan may be stored in one or more data structures that may be used to define one or more joints in a model. The one or more joints may be used to define one or more bones that may correspond to a body part of a human.

Figure 7:
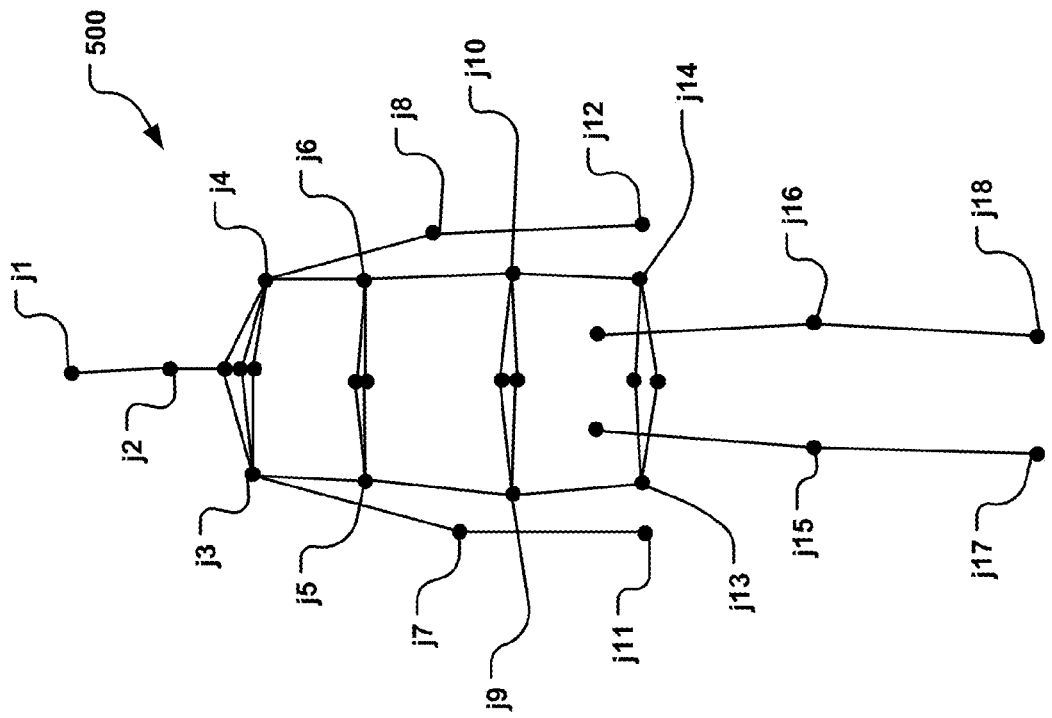
FIG. 7 illustrates an example embodiment of a model that may be generated for a human target associated with a user.

FIG. 7 illustrates an example embodiment of a model 500 that may be generated for a user at 310. According to an example embodiment, the model 500 may include one or more data structures that may represent, for example, a three-dimensional model of a human target associated with a user in a depth image such as the human target 402 in the depth image 400 described above with respect to FIG. 6. In one embodiment, each body part of the human target associated with the user may be characterized as a mathematical vector defining joints and bones of the model 500.

As shown in FIG. 7, the model 500 may include one or more joints j1-j18. According to an example embodiment, each of the joints j1-j18 may enable one or more body parts defined therebetween to move relative to one or more other body parts. For example, a model representing a human target may include a plurality of rigid and/or deformable body parts that may be defined by one or more structural members such as "bones" with the joints j1-j18 located at the intersection of adjacent bones. The joints j1-18 may enable various body parts associated with the bones and joints j1-j18 to move independently of each other. For example, the bone defined between the joints j7 and j11, shown in FIG. 7, may correspond to a forearm that may be moved independent of, for example, the bone defined between joints j15 and j17 that may correspond to a calf.

As described above, each of the body parts may be characterized as a mathematical vector having an X value, a Y value, and a Z value defining the joints and bones shown in FIG. 7. In an example embodiment, intersection of the vectors associated with the bones, shown in FIG. 7, may define the respective point associated with joints j1-j18.

Referring back to FIG. 5, at 315, a real-time, or live, motion of the model associated with the user may be captured. For example, the model may be tracked such that the model may be adjusted or moved to mimic a movement by the user. Such adjustments or motions of the model associated with the user may be captured in real-time. Additionally, such adjustments or motions may be applied to a virtual character such an avatar, an on-screen character, an on-screen object, or the like, which will be described in more detail below.

According to one embodiment, the model such as the model 500 described above with respect to FIG. 7 may be a representation of a user such as the user 18 described above with respect to FIGS. 1A and 1B. The target recognition, analysis, and tracking system may observe or capture movements from the user 18 that may be used to adjust or move the model 500 such that the adjustments or motions of the model 500 may be captured at 315.

For example, a capture device such as the capture device 20 described above with respect to FIGS. 1A-2 may be observe or capture multiple images such as depth images, RGB images, or the like of a scene that may be used to adjust the model. According to one embodiment, each of the images may be observed or captured based on a defined frequency. For example, the capture device may observe or capture a new image of a scene every millisecond, microsecond, or the like.

Upon receiving each of the images, information associated with a particular image may be compared to information associated with the model to determine whether a movement may have been performed by the user. For example, in one embodiment, the model may be rasterized into a synthesized image such as a synthesized depth image. Pixels in the synthesized image may be compared to pixels associated with the human target in each of the received images to determine whether the human target in a received image has moved.

According to an example embodiment, one or more force vectors may be computed based on the pixels compared between the synthesized image and a received image. The one or more force may then be applied or mapped to one or more force-receiving aspects such as joints of the model to adjust or move the model into a pose that more closely corresponds to the pose of the human target or user in physical space.

The adjustments or motions of the tracked model may then be captured at 315. In one embodiment, the adjustments or motions of the tracked model may be recorded in a motion capture file. For example, the target recognition, analysis, and tracking system may render and store a motion capture file that may include one or more motions such as a waving motion, a swinging motion such as a golf swing, a punching motion, a walking motion, a running motion, or the like specific to the user such as the user 18 described above with respect to FIGS. 1A and 1B. According to one embodiment, the motion capture file may be generated in real-time based on the information such as the vectors including the X, Y, and Z values associated with the tracked mode and may include one or more frames of the movements performed by the user that may be applied to the model. The motions of the model in the motion capture file may further be applied to a virtual character such as an avatar, an on-screen object, an on-screen character, or the like in real time, or live. Additionally, the motions of the model in the motion capture file may be stored or pre-recorded such that the motion capture file may be applied to a virtual object or character at a future point in time, which will be described in more detail below.

Figure 8B:
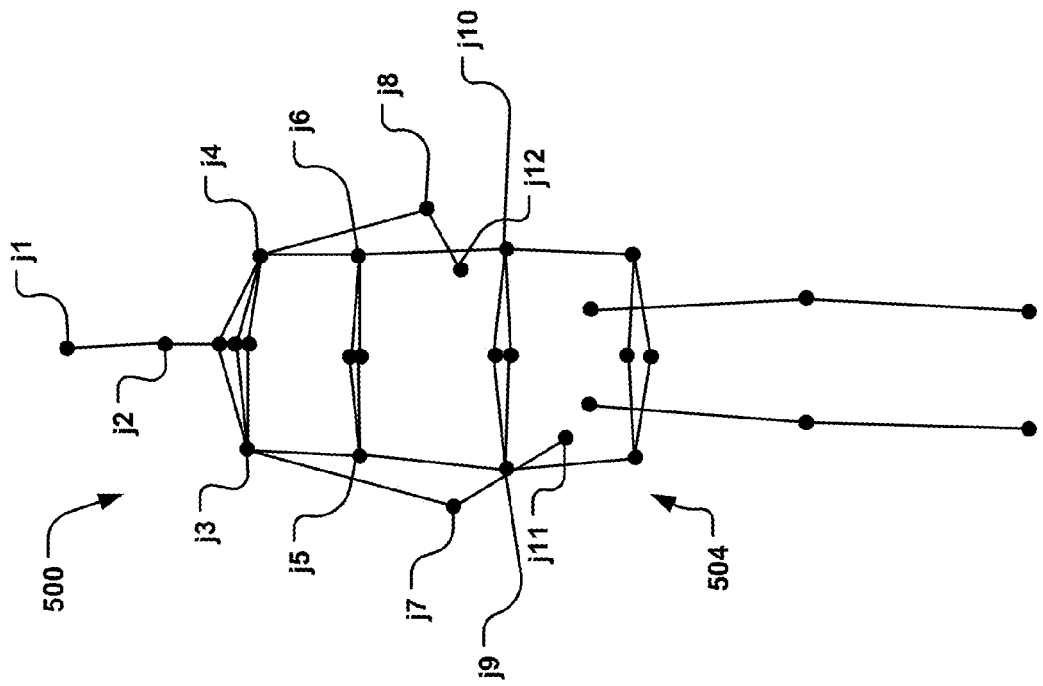
FIGS. 8A-8B illustrate an example embodiment of a model associated with a user that may be captured at various points in time in a motion capture file.
Figure 8A:
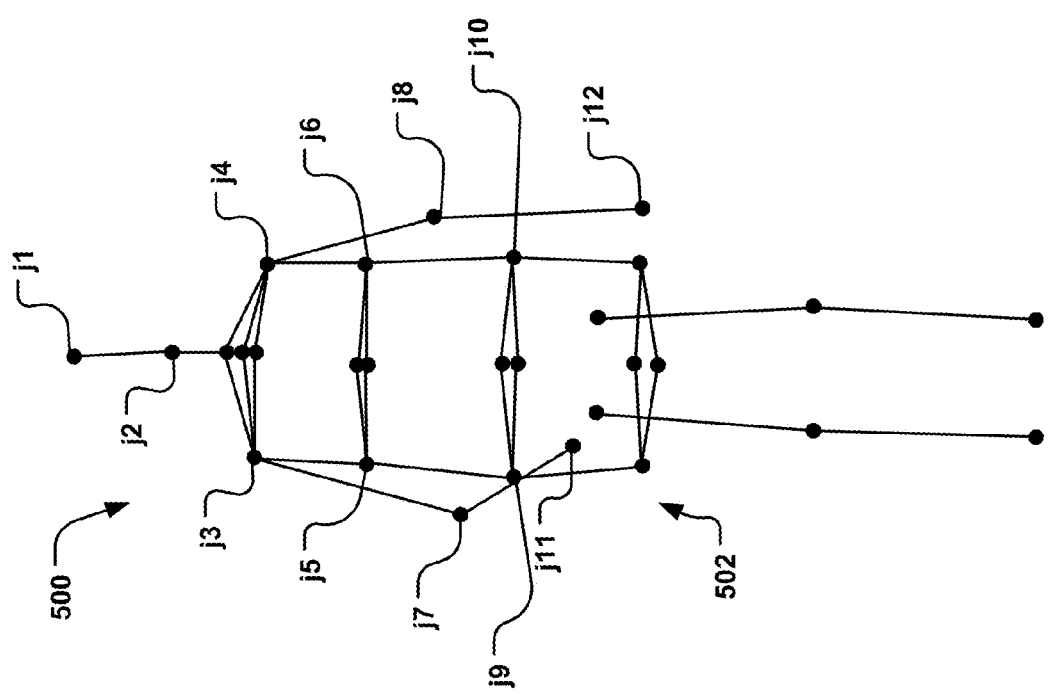

FIGS. 8A-8B illustrate an example embodiment of the model 500 associated with a user such as the user 18 described above with respect to FIGS. 1A and 1B that may be captured at various points in time in a motion capture file. As shown in FIGS. 8A-8B, the model 500 described above with respect to FIG. 7 may be adjusted or moved based on movements of the user at various points in time as described above. For example, as shown in FIG. 8A, the joints j3, j7, and j11 and the bones defined therebetween of the model 500 may be adjusted or moved to represent pose 502 when the user raises his or her right forearm by, for example, applying one or more force vectors to the joints j3, j7, and j11 as described above. After the user raises his or her right forearm as shown in FIG. 8A, the user such as the user 18 may then raise his or her left forearm. As shown in FIG. 8B, the model 500 may then be adjusted from the pose 502 to a pose 504 such that the joints j4, j8, and j12 and the bones defined therebetween of the model may be adjusted or moved when the user raises his or her left forearm by, for example, applying one or more force vectors to the joints j4, j8, and j12 as described above. The adjustments or motions that may be applied to the model 500 as shown by poses 502 and 504 in FIGS. 8A and 8B may be captured at 315 in respective frames of the motion capture file as described above.

Referring back to FIG. 5, a pre-recorded motion may be received at 320. For example, the target recognition, analysis, and tracking system may receive a pre-recorded motion for a virtual character such as an on-screen game character, an avatar, an on-screen object, or the like. In one embodiment, the pre-recorded motion may be an artist developed animation or motion capture file for a virtual character or object developed by an application developer and/or a programmatically controlled transformation such as an input device controlled animation or motion, a rag doll animation or motion, or the like developed by an application developer. According to another embodiment, the pre-recorded motion may be the motion capture file of the model associated with the user of the target recognition, analysis, and tracking system that may be stored for future use as described above.

FIGS. 9A-9B illustrate an example embodiment of a character model 600 for a virtual object or character such as a centaur at various points in time or in various frames that may be received as a pre-recorded artist developed motion at 320. As shown in FIGS. 9A-9B, the character model 600 may include one or more joints j1'-j20'. In one embodiment, each of the joints j1'-j20' may define one or more body parts that may move relative to or independent of one or more other body parts at the joints j1'-j20' to animate a virtual object or character, which will be described in more detail below.

Additionally, according to an example embodiment, each of the joints j1'-j20' of the character model 600 may have a corresponding animation track in the pre-recorded artist developed animation or motion capture file at various points in time or in a respective frame of the pre-recorded artist developed animation or motion capture file. For example, as shown in FIG. 9A, the joints j16', j18', and j20' and the body parts defined therebetween of the character model 600 may each have an animation track that may result in a pose 602 of the character model 600 in the pre-recorded artist developed animation or motion file at a first point in time or at a first frame in the pre-recorded artist generated animation or motion capture file. The joints j16', j18', and j20' may then be adjusted to represent a pose 604 for each of the animation tracks for the joints j16', j18', and j20' of the character model 600 in the pre-recorded artist developed animation or motion file a subsequent, or second point in time or a second, or subsequent, frame.

Referring back to FIG. 5, at 325, the motion of the model and/or the pre-recorded motion may be applied to a virtual object or character. For example, the target recognition, analysis, and tracking system may map one or more real-time, or live, motions and/or pre-recorded motions of the user to at least a portion of a virtual object or character such that the virtual object or character may be animated to mimic movements performed by the user such as the user 18 described above with respect to FIGS. 1A and 1B. Additionally, the target recognition, analysis, and tracking system may map one or more pre-recorded artist developed animations or motions or and/or one or more pre-recorded programmatically controlled transformations to at least a portion of a virtual object or character such that the virtual object or character may be animated to mimic the pre-recorded artist developed motions and/or the pre-recorded programmatically controlled transformations.

FIGS. 10A-10B illustrate an example embodiment of a virtual character 700 that may have a live motion of a user and/or a pre-recorded motion applied thereto at 325. As shown in FIGS. 10A-10B, the character 700 may include a centaur that may be a character in, for example, a game application. According to one embodiment, the virtual character 700 may be animated with a live motion of the tracked model associated with the user and a pre-recorded motion such as a pre-recorded artist developed motion at 325. For example, a first portion A of the virtual character 700 may be animated with the live motion performed by the user such as the user 18 described above with respect to FIGS. 1A and 1B and a second portion B may be animated with the pre-recorded artist develop motion.

According to an example embodiment, the joints j1-j12 of the model 500 associated with the user as described above with respect to FIGS. 7-8B may be mapped to the first portion A of the virtual character 700 and the joints j9'-j20' of the character model 600 as described above with respect to FIG. 9A-9B may be mapped to the second portion B of the virtual character 700 such that the first portion A may be animated to mimic live motions that may be performed by the user and the second portion B may be animated to mimic animations of a character model such as the character model 600 associated with the virtual character 700. For example, the joints j4, j8, and j12 and the bones defined therebetween of the model 500 shown in FIGS. 8A-8B may be mapped to a left shoulder, a left elbow, and a left wrist and the corresponding body parts defined therebetween of the virtual character 700 such that the first portion A of the virtual character 700 shown in FIGS. 10A-10B may mimic the poses 502 and 504 of the joints j4, j8, and j12 shown in FIGS. 8A-8B associated with the user moving his or her left arm. Additionally, the joints j16', j18', and j20' and the body parts defined therebetween of the character model 600 shown in FIGS. 9A-9B may be mapped to a front left hip, a front left knee, and a front left ankle and the corresponding body parts defined therebetween of the virtual character 700 such that the second portion B of the virtual character 700 shown in FIGS. 10A-10B may mimic the poses 602 and 604 of the joints j16', j18', and j20' shown in FIGS. 9A-9B of a model of a centaur extending its left front leg. Thus, according to an example embodiment, the virtual character 700 may include live motions of the model 500 associated with the user blended with the pre-recorded motions of the character model 600 associated with the virtual character or object.

In one embodiment, to animate the virtual character 700 with the live motions and the pre-recorded motions, the target recognition, analysis, and tracking system may disable animation or motion tracks associated with the joints and/or body parts of the character model 600 that correspond to the first portion A of the virtual character 700. Additionally, the target recognition, analysis, and tracking system may disable the animations or motions associated with the joints of the model 500 in the motion capture file that correspond to the second portion B of the virtual character 700. The target recognition, analysis, and tracking system may then blend the animations or motions of the model 500 associated with the user in the motion capture file with the animation or motion tracks of the character model 600 such that the first portion A may be animated with the motions of the model 500 associated with the user and the second portion may be animated with animations or motions of the character model 500 associated with the virtual character 700.

For example, the target recognition, analysis, and target system may disable the animation or motion tracks of the joints j1'-j8' of the character model 600 and the animations or motions of the joints j13-j18 of the model 500 associated with the user. The target recognition, analysis, and target system may then blend the animations and motions of the character model 600 and the model 500 associated with the user such that the first portion A of the virtual character 700 may mimic movements by the user and the second portion B of the virtual character 700 may mimic pre-recorded animations or motions of a character model as shown in FIGS. 10A-10B.

FIGS. 11A-11F illustrate another example embodiment of a virtual character 800 that may have a live motion of a user and/or a pre-recorded motion applied thereto at 325. As shown in FIGS. 11A-11F, the virtual character 800 may include a robot that may be a character in, for example, a game application. According to one embodiment, the virtual character 800 may be animated with a live motion of the tracked model associated with the user and/or a pre-recorded motion such as a stored motion of a model associated with the user or a pre-recorded artist developed motion at 325. For example, a first portion A' of the virtual character 800 may be animated with the live motion performed by the user such as the user 18 described above with respect to FIGS. 1A and 1B and/or a second portion B' may be animated with the pre-recorded motion of the user in the motion capture file or a pre-recorded artist developed motion.

According to one embodiment, the live and/or pre-recorded motions or animations may be applied to the virtual character 800 in response to a gesture received from a user. For example, one of the real-time, or live, motions of the model associated with the user that may be captured at 315 may include a gesture that may be used to control the movement or animation of the virtual character 800 at 325.

In an example embodiment, a user may lift his or her left arm such that the model associated with the user may be adjusted to mimic the user lifting his or her left arm and may be captured at 315. For example, the joints j4, j8, and j12 of the model 500 described above with respect to FIGS. 7-8B may be adjusted to reflect the user lifting his or her left arm. The target recognition, analysis, and tracking system may then interpret the gesture associated with the left arm being raised such that the target recognition, analysis, and tracking system may apply a pre-recorded motion or live motion to at least a portion such as the first portion A' of the virtual character 800, may switch from a pre-recorded motion or a live motion being applied to at least a portion such as the first portion A' of the virtual character 800, or the like in response to the gesture associated with the left arm being raised by the user.

Figure 11C:
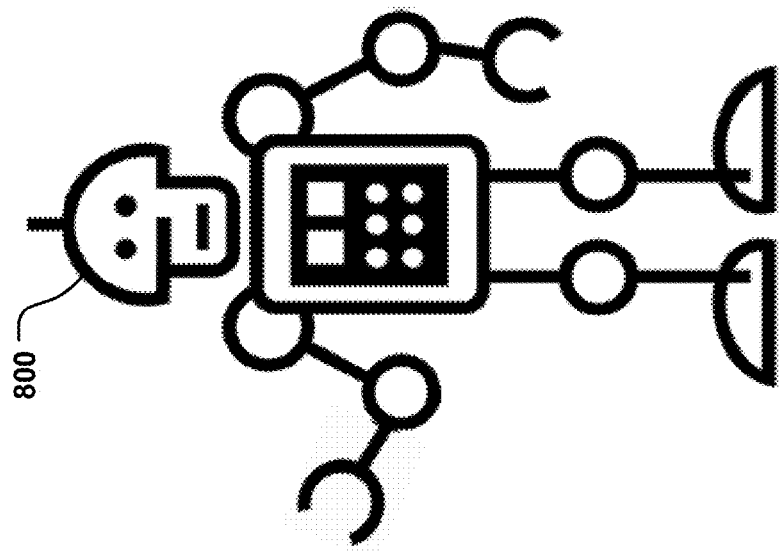
FIGS. 11A-11F illustrate another example embodiment of a virtual character that may be animated.
Figure 11B:
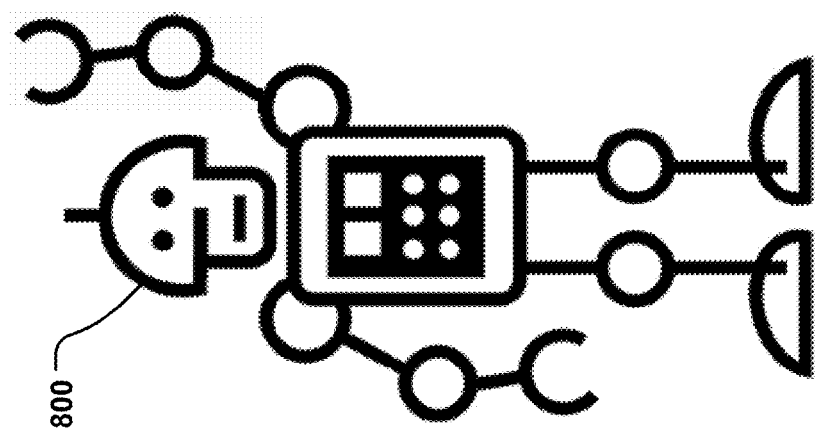
Figure 11A:
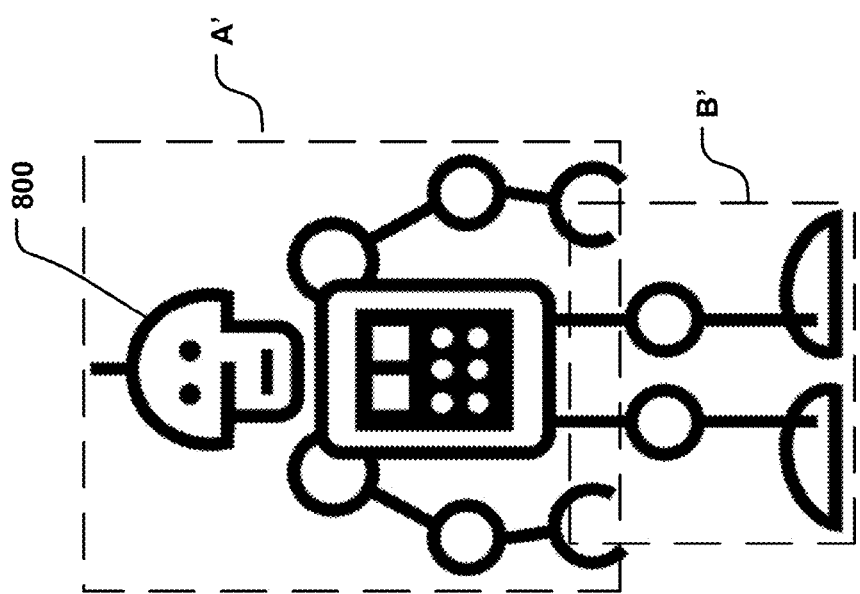

For example, according to one embodiment, in response to the user raising his or her left arm, the virtual character 800 may be animated based on the adjustments made to, for example, the model 500 associated with the user such that the live motion of the user raising his or her left arm may be applied to, for example, the first portion A' of the virtual character 800 as shown in FIG. 11B. That is, in response to the user raising his or her left arm, the joints j4, j8, and j12 of the model 500 associated with the user may be mapped to a left arm of the virtual character 800 such that the first portion A' of the virtual character 800 may be animated by live motions performed by the user with his or her upper body. Additionally, subsequent movement by the user of his or her upper body may further be applied to the virtual character 800. For example, as the user lifts his or her right forearm, the live motions of the user lifting his or her right forearm may be applied to the joints j7 and j11 of the model 500. The live motions may then be applied to the virtual character 800 as described above such that the virtual character 800 may be animated or moved to lift his or her left forearm as shown in FIG. 11C. Thus, according to one embodiment, in response to a gesture being received, at least a portion of the virtual character 800 may be animated to mimic the movements by the user that may be applied to the model 500 associated with the user.

Similarly, a user may lift his or her left leg such that the model associated with the user may be adjusted to mimic the user lifting his or her left leg and may be captured at 315. For example, the joints j14, j16, and j18 of the model 500 described above with respect to FIGS. 7-8B may be adjusted to reflect the user lifting his or her left leg. The target recognition, analysis, and tracking system may then interpret the gesture associated with the left leg being raised such that the target recognition, analysis, and tracking system may apply a pre-recorded motion or live motion to at least a portion such as the second portion B' of the virtual character 800, may switch from a pre-recorded motion or a live motion being applied to at least a portion such as the second portion B' of the virtual character 800, or the like in response to the gesture associated with the left leg being raised by the user.

Figure 11F:
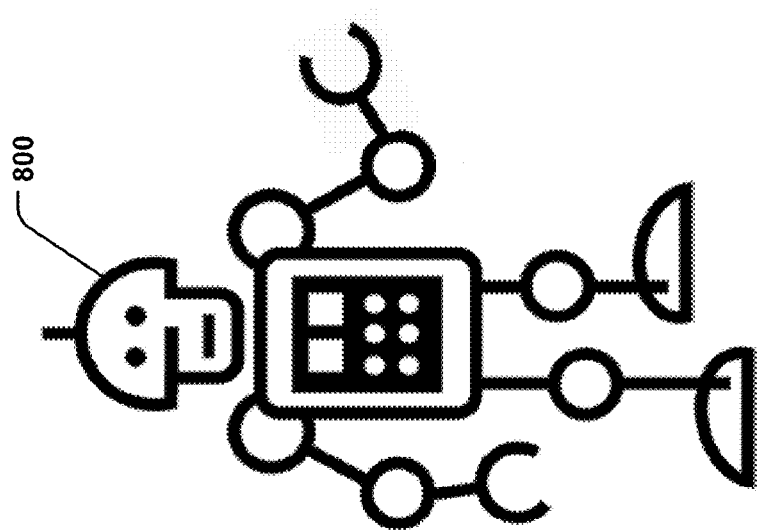
Figure 11E:
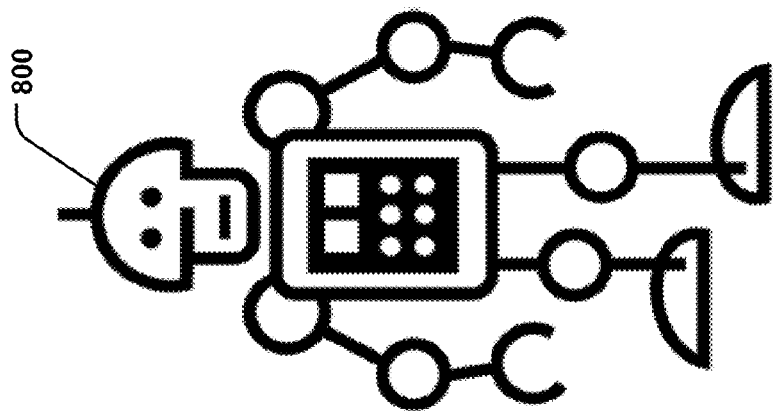
Figure 11D:
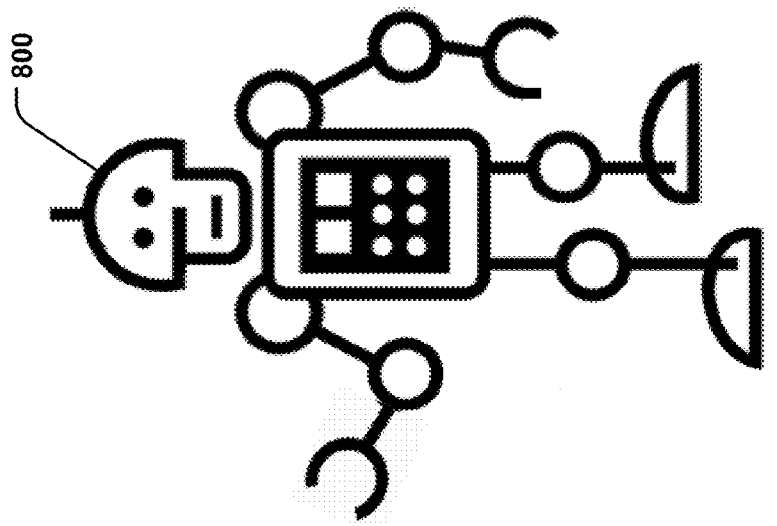

For example, according to one embodiment, in response to the user raising his or her left leg, the second portion B' of the virtual character 800 may be animated with a pre-recording walking motion such as a pre-recorded walking motion of the model 500 associated with the user captured in a motion capture file or an artist developed walking animation as shown in FIG. 11D-11F. That is, in response to the user raising his or her left leg, the joints j13-j18 of the model 500 in the stored motion capture file may be mapped to a respective right and left leg of the virtual character 800 such that the second portion B' of the virtual character 800 may be animated by a pre-recorded walking motions performed by the user. Alternatively, in response to the user raising his or her left leg, joints and/or body parts of a character model may be mapped to a respective right and left leg of the virtual character 800 such that the second portion B' of the virtual character 800 may be animated by a pre-recorded artist developed walking motion.

In one embodiment, the live motions of the user and/or the pre-recorded motions may be applied to, for example, the first and second portions A' and B' of the virtual character 800 until a subsequent gesture that may control the animations being applied to the virtual character 800 may be received. For example, the live motions of the user may be applied to, for example, the first portion A' of the virtual character 800 until a subsequent gesture such as the user raising both his or her right and left arms may be received. Upon receiving the subsequent gesture, the first portion A' of the virtual character 800 may be at rest or switched to be animated with, for example, a pre-recorded motion such as a pre-recorded motion of the user in the motion capture file described above or a pre-recorded artist generated animation.

According to an example embodiment, to animate the first portion A' of the virtual character 800 in response to the user raising his or her left hand with the live motions performed by the user with his or her upper body, the target recognition, analysis, and tracking system may disable animations or motions of the joints and/or body parts such as the joints j13-j18 of the model 500 associated with the lower body of the user. Additionally, to animate the second portion B' of the virtual character 800 in response to the user raising his or her left leg with the pre-recorded walking motions, the target recognition, analysis, and tracking system may disable the animations or motions of the joints and/or body parts of a character model or the model 500 associated with the upper body of the character model associated with the virtual character 800 or the user. The target recognition, analysis, and tracking system may then blend the enabled d live animations or motions of the upper body of the user with the with the enabled pre-recorded walking motions of the character model 600 such that the first portion A' may be animated with the live motions of the upper body of the user in response to use raising his or her left arm with the pre-recorded walking motions as shown in FIGS. 11D-11F.

Additionally, in one embodiment, in response to receiving a subsequent gesture such as the user raising both arms, that may switch, for example, a live motion of the user being applied to the first portion A' of the virtual character 800 with a pre-recorded motion, the target recognition, analysis, and tracking system may blend the transition over, for example, a predetermined number of frames such as 15-20 frames such that the first portion A' of the virtual character may transition smoothly between the live motion and the pre-recorded motion. For example, each of the joints and/or body parts of the model 500 in the live motions may be blended with corresponding joints and/or body parts in the pre-recorded motions over 15-20 frames. Thus, each joint associated with the upper body of the model 500 at a first frame of the live motions in the motion capture file may be blended with each corresponding joint and/or body part of a character model in a first frame of the pre-recorded motions or animations. The live motions may then be phased out after the predetermined number of frames such that the first portion A' of the virtual character 800 may be animated with the pre-recorded motion or animations.

Figure 12B:
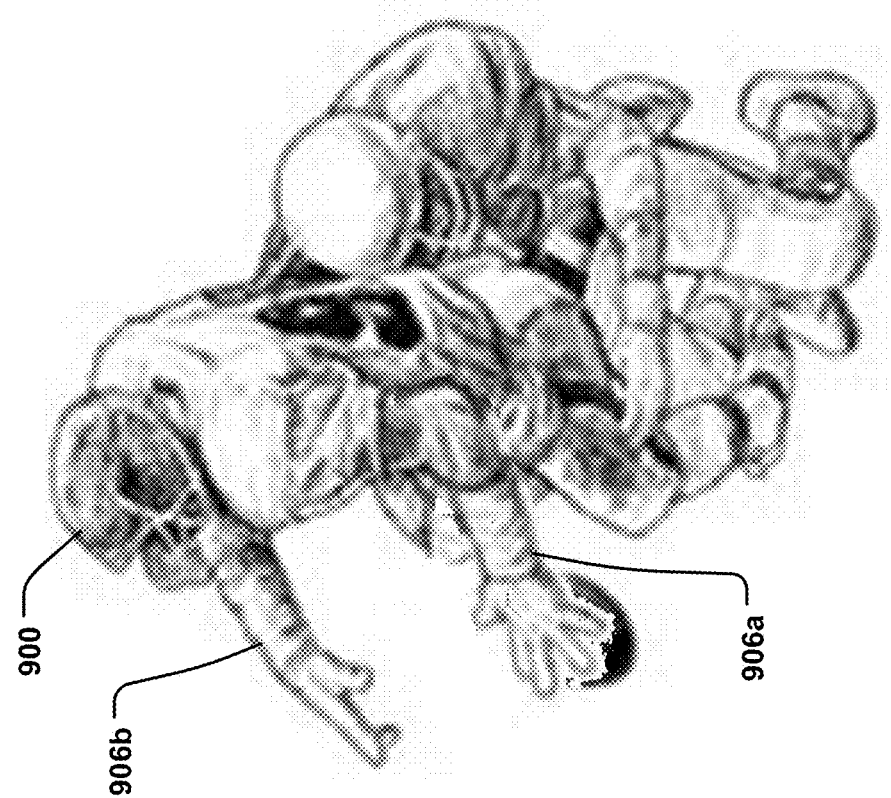
FIGS. 12A-12B illustrate another example embodiment of a virtual game character that may be animated.
Figure 12A:
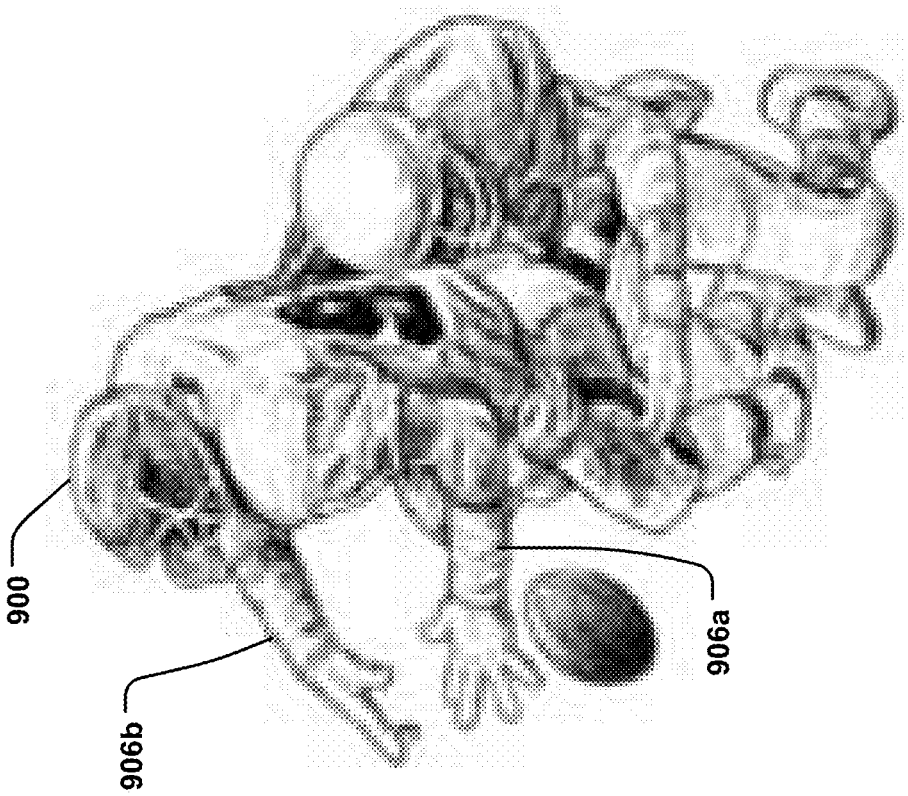

FIGS. 12A-12B illustrate an example embodiment of a game character 900 that may have a live motion of a user and/or a programmatically controlled transformation applied thereto at 325. As shown in FIGS. 12A-12B, the game character 900 may include a football player that may be a character in, for example, a football game application. According to one embodiment, the game character 900 may be animated with a live motion of the tracked model associated with the user and a programmatically controlled transformation such as an input device controlled animation or motion, a rag doll animation or motion, or the like at 325. For example, a first portion such as arms 906a and 906b of the game character 900 may be controlled or animated by a live motion performed by the user such as the user 18 described above with respect to FIGS. 1A and 1B with his or her arms. According to an example embodiment, a second portion such as each of the remaining body parts of the game character 900 shown in FIGS. 12A-12B may have a pre-recorded programmatically controlled transformation applied thereto.

In one embodiment, the pre-recorded programmatically controlled transformation may include a goal based animation or motion that may use physics to enable a game character such as the game character 900 reach its goal in an application. For example, the game character 900 may be a wide receiver that may have a goal to reach a particular location on a football field provided in the football game application to catch a pass. The pre-recorded programmatically controlled transformation may include an animation or motion using, for example, physics that may cause the game character 900 to automatically reach that location.

Additionally, according to another example embodiment, the game character 900 may be tackled by a game character on an opposing team as shown in FIGS. 12A-12B. The programmatically controlled transformation may include a pre-recorded motion or an animation based on a rag doll that may be positioned to tackled the game character 900 at a given position in the football game application. For example, the programmatically controlled transformation motion or animation may include an rag doll animation or motion that may be generated based on a physics calculation based on a reaction of the game character 900 as the game character 900 may be tacked by a rag doll associated with the location of the opposing player.

Thus, in one embodiment, the arms 906a and 906b may have a live motion of the arms of the user being applied thereto and the remaining body parts of the game character 900 may be animated with the programmatically controlled transformation of the rag doll animation or motion associated with the opposing player tackling the game character 900 such that the user may remain in control of the arms 906a and 906b to make the catch as shown in FIGS. 12A-12B and the remaining portion of the body may react in a manner similar to the player being tacked in real-life by an opposing player.

Thus, in an example embodiment, the visual appearance of an on-screen character may be changed at 325 shown in FIG. 5 in response to one or more live or pre-recorded motions in the motion capture file. For example, a game player such as the user 18 described above with respect to FIGS. 1A-1B playing an electronic game on a gaming console may be tracked by the gaming console as described herein. As the game player swings an arm, the gaming console may track this motion, then in response to the tracked motion, may adjust the model associated with the user. As described above, the tracked model may further be captured in a motion capture file. The motion capture file may then be applied to, for example, an upper body portion of an on-screen character such that the on-screen character may be animated to mimic the actual motion of the user swinging their arm. Additionally, a pre-recorded artist generated motion or a pragmatically controlled transformation may be blended with live or pre-recorded motions in the motion capture file. For example, according to example embodiments, the on-screen character may be animated to swing, for example, a golf club, a bat, or throw a punch in a game exactly like the user swings his or her arm in real-time, or live and may be animated to run, walk, or bike like a professional athlete that may be captured in a pre-recorded run, walk, or bike motion or animation.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A computer-implemented method for blending motions, the computer-implemented method comprising:
   capturing a live motion of a user;
   receiving a pre-recorded motion; and
   applying the live motion to a first portion of a virtual character and the pre-recorded motion to a second portion of the virtual character, wherein the applying comprises:
     mapping one or more body parts of the virtual character to one or more joints in a model of the user; and
     mapping one or more body parts of the virtual character to one or more body parts of a character model associated with the pre-recorded motion;
     disabling one or more joints in the model of the user that correspond to the one or more body parts in the second portion of the virtual character;
     disabling one or more joints in the character model associated with the pre-recorded motion that correspond to the one or more body parts in the first portion of the virtual character;
     blending the live motion associated with the model of the user with the pre-recorded motion associated with the character model; and
     animating the first portion and the second portion of the virtual character with the blended live and pre-recorded motions.

2. The computer-implemented method of claim 1, wherein pre-recorded motion comprises at least one of the following: a pre-recorded motion of the user; an artist developed motion; and a programmatically controlled transformation.

3. The computer-implemented method of claim 1, further comprising:
   receiving an image, wherein the images includes a human target associated with the user; and
   generating the model of the user based on the human target in the received image.

4. The computer-implemented method of claim 3, further comprising:
   adjusting the model of the user to mimic a movement by the user; and
   capturing the adjusted model of the user to capture the live motions of the user.

5. The computer-implemented method of claim 1, wherein the applying further comprises:
   blending the live motion associated with the model of the user with the pre-recorded motion associated with the character model in response to disabling the one or more joints in the model of the user and the one or more joints in the character model.

6. The computer-implemented method of claim 1, further comprising receiving a gesture from the user, wherein the gesture is associated with a command to apply an animation to the virtual character.

7. The computer-implemented method of claim 6, wherein at least one of the live motion and the pre-recorded motion is applied to the respective first and second portions of the virtual character in response receiving the gesture from the user.

8. A system for rendering a model of a user; the system comprising:
one or more memories that store computer executable instructions; and
one or more processors, wherein the one or more processors execute the computer executable instructions, and wherein the computer executable instructions comprise instructions for:
receiving a pre-recorded motion and a live motion of a user;
mapping one or more body parts of a virtual character to one or more joints in a first model of the user associated with the live motion;
mapping one or more body parts of the virtual character to one or more body parts of a second model associated with the pre-recorded motion;
disabling one or more joints in the first model of the user that correspond to the one or more body parts in a second portion of the virtual character;
disabling one or more joints in the second model associated with the pre-recorded motion that correspond to the one or more body parts in a first portion of the virtual character;
blending the live motion associated with the first model of the user with the pre-recorded motion associated with the second model; and
animating the virtual character with the blended pre-recorded motion and the blended live motion.

9. The system of claim 8, wherein pre-recorded motion comprises at least one of the following: a pre-recorded motion of the user; an artist developed motion; and a programmatically controlled transformation.

10. The system of claim 8, wherein the instructions for animating the virtual character with the pre-recorded motion and the live motion further comprise instructions for:
blending the live motion associated with the first model of the user with the pre-recorded motion associated with the second model in response to disabling the one or more joints in the first model of the user and the one or more joints in the second model.

11. The system of claim 8, further comprising instructions for receiving a gesture from the user, wherein the gesture is associated with a command to apply an animation to the virtual character.

12. The system of claim 11, wherein the virtual character is animated with the live motion and the pre-recorded motion in response receiving the gesture from the user.

13. One or more computer-readable storage devices having stored thereon computer executable instructions for blending motions, the computer executable instructions comprising instructions for performing operations comprising:
capturing a live motion of a user;
receiving a pre-recorded motion; and
applying the live motion to a first portion of a virtual character and the pre-recorded motion to a second portion of the virtual character, wherein the applying comprises:
mapping one or more body parts of the virtual character to one or more joints in a model of the user;
mapping one or more body parts of the virtual character to one or more body parts of a character model associated with the pre-recorded motion;
disabling one or more joints in the model of the user that correspond to the one or more body parts in the second portion of the virtual character; and
disabling one or more joints in the character model associated with the pre-recorded motion that correspond to the one or more body parts in the first portion of the virtual character
blending the live motion associated with the model of the user with the pre-recorded motion associated with the character model; and
animating the first portion and the second portion of the virtual character with the blended live and pre-recorded motions.

14. The one or more computer-readable storage devices of claim 13, wherein pre-recorded motion comprises at least one of the following: a pre-recorded motion of the user; an artist developed motion; and a programmatically controlled transformation.

15. The one or more computer-readable storage devices of claim 13, wherein the operations further comprise:
receiving an image, wherein the images includes a human target associated with the user; and
generating the model of the user based on the human target in the received image.

16. The one or more computer-readable storage devices of claim 15, wherein the operations further comprise:
adjusting the model of the user to mimic a movement by the user; and
capturing the adjusted model of the user to capture the live motions of the user.

17. The one or more computer-readable storage devices of claim 13, wherein the applying further comprises:
blending the live motion associated with the adjusted model of the user with the pre-recorded motion associated with the character model in response to disabling the one or more joints in the model of the user and the one or more joints in the character model.

18. The one or more computer-readable storage devices of claim 13, wherein the operations further comprise receiving a gesture from the user, wherein the gesture is associated with a command to apply an animation to the virtual character.

19. The one or more computer-readable storage devices of claim 18, wherein at least one of the live motion and the pre-recorded motion is applied to the respective first and second portions of the virtual character in response receiving the gesture from the user.

* * * * *